United States Patent
Perherin et al.

(10) Patent No.: US 12,447,669 B2
(45) Date of Patent: Oct. 21, 2025

(54) AIRCRAFT FLUID CONDUIT COMPRISING THERMOPLASTIC PIPING AND CONNECTOR

(71) Applicant: AIRBUS ATLANTIC, Rochefort (FR)

(72) Inventors: Daniel Perherin, Saint-Nazaire (FR); Daniel Boulze, Aussonne (FR)

(73) Assignee: AIRBUS ATLANTIC, Rochefort (FR)

( * ) Notice: Subject to any disclaimer, the term of this patent is extended or adjusted under 35 U.S.C. 154(b) by 31 days.

(21) Appl. No.: 18/246,650

(22) PCT Filed: Sep. 14, 2021

(86) PCT No.: PCT/EP2021/075150
§ 371 (c)(1),
(2) Date: Mar. 24, 2023

(87) PCT Pub. No.: WO2022/073723
PCT Pub. Date: Apr. 14, 2022

(65) Prior Publication Data
US 2023/0364853 A1    Nov. 16, 2023

(30) Foreign Application Priority Data
Oct. 5, 2020 (FR) ........................................ 2010157

(51) Int. Cl.
*B29C 63/34* (2006.01)
*B29C 57/00* (2006.01)
*F16L 37/084* (2006.01)

(52) U.S. Cl.
CPC .......... *B29C 63/346* (2013.01); *B29C 57/005* (2013.01); *F16L 37/084* (2013.01)

(58) Field of Classification Search
CPC .......... F16L 47/20; F16L 13/147; F16L 25/01
See application file for complete search history.

(56) References Cited

U.S. PATENT DOCUMENTS 5,139,290 A * 8/1992 Shafer ..................... F16L 47/20
6,050,609 A * 4/2000 Boscaljon .............. F16L 25/01
(Continued)

FOREIGN PATENT DOCUMENTS

DE    10142684 C1 * 11/2002 .............. F16L 27/12
EP    0530387 A1    3/1993
(Continued)

OTHER PUBLICATIONS

Search Report from the French Intellectual Property Office on corresponding FR application (FR2010157) dated Jul. 1, 2021.
(Continued)

*Primary Examiner* — Zachary T Dragicevich
(74) *Attorney, Agent, or Firm* — Alumen IP Law PC

(57) ABSTRACT

A fluid conduit for aircraft, the conduit having a pipe made from thermoplastic material having a connection end which extends along a pipe axis and a connector which is intended to be mounted in the connection end by a translational movement along the pipe axis in a downstream direction, the connector having a joining portion which extends longitudinally along the connector axis and which is configured to extend into the connection end, the joining portion having a free longitudinal end which is chamfered, the free longitudinal end being configured to be radially deformed after the connector is mounted in the connection end, which has been thermally expanded beforehand, so that the conduit has an internal surface which has an internal radius which is substantially constant at the interface between the connector and the pipe.

19 Claims, 4 Drawing Sheets

(56) References Cited

U.S. PATENT DOCUMENTS 6,226,855 B1 * 5/2001 Maine .................. F16L 13/147
2013/0277960 A1 * 10/2013 Neal ..................... F16L 25/01

FOREIGN PATENT DOCUMENTS

EP          3628907 A1    4/2020
WO     9919658 A1    4/1999

OTHER PUBLICATIONS

International Search Report and Written Opinion on corresponding PCT application (PCT/EP2021/075150) from International Searching Authority (EPO) dated Dec. 13, 2021.

* cited by examiner

AIRCRAFT FLUID CONDUIT COMPRISING THERMOPLASTIC PIPING AND CONNECTOR

TECHNICAL FIELD

The present invention relates to the field of fluid circuits in an aircraft, for example a drinking water, waste water, drainage circuit, etc. In a known manner, a fluid circuit in an aircraft comprises a plurality of conduits connected to the aircraft structure and connected together by connecting linkages. In a known manner, each conduit has a rectilinear or bent piping, the ends of which are fitted with a connector to allow robust and tight connection with a connecting linkage.

In order to lighten the mass of an aircraft, pipings are increasingly made of thermoplastic material, and more particularly in a polymer known as PEEK (meaning polyetheretherketone) which makes it possible to manufacture semi-rigid, light and robust pipings. Such a piping also has a low thickness.

In a known manner, with reference to [FIG. 1], a conduit 100 comprising a piping 101 equipped with a connector 102 is represented. The piping 101 comprises a connection end 111, extending along a piping axis X, for being mechanically connected with a connection end of another adjacent piping (not represented). To enable linking to an adjacent piping, the connector 102 is inserted into the connection end 111 so as to rigidify it and thus allow tight linking. By reference, it is subsequently defined that the piping axis X is oriented from upstream to downstream, that is it extends from outside to inside the piping 101 at its connection end 111.

As illustrated in the half cross-section view of [FIG. 2] representing the connector 102 and the piping 101 in the unassembled position, the piping 101 defines a piping internal surface SI in contact with the fluid and a piping external surface SE, opposite to the internal surface SL In this example, the piping 101 has an internal radius RI. The connector 102 comprises a connecting portion 121, configured to be inserted inside the connection end 111 of the piping 101. and a linking portion 122. configured to extend outside the piping 101 and for cooperating with a connecting linkage to connect the piping 101 to another adjacent piping. In this example, the linking portion 122 comprises a cooperation member, in particular an annular groove 123. In a known manner, the connecting portion 121 of the connector 102 comprises an internal radius R2 which is substantially equal to the internal radius RI of the piping 101 so as to ensure continuity of the internal radius in the assembled position.

To insert the connector 102 into the connection end 111 of the piping 101 along the piping axis X, the connection end 111 of thermoplastic material is heated to become malleable and expand radially. During cooling, the connection end 101 radially retracts around the connection portion 121 of the connector 102 so as to snugly fit its shape as illustrated in [FIG. 3], Following assembly, the connection end 111 and the connector 102 are integral with each other and tightly connected.

This type of assembling method has drawbacks. Indeed, when cooling the thermoplastic piping 101, it radially deforms the connecting portion 121 of the connector 102 also of thermoplastic material inside the piping 101, as represented in [FIG. 3]. The radial deformation yields an internal protrusion S at the internal surface SI of the piping 101. This protrusion S forms an entrapment zone for liquids or residues in the piping 101, which may degrade maintenance conditions and have drawbacks relating to health conditions required in the piping 101.

An immediate solution to eliminate this drawback would be to increase rigidity of the connector 102 to limit its radial deformation during cooling. Such a solution cannot be retained because it cannot prevent radial deformation of the connector of thermoplastic material.

The invention thus aims to eliminate at least some of these drawbacks by providing a conduit comprising a connector assembled to a piping whose health maintenance and reliability are improved.

Documents WO99/19658A1, EP0530387A1 and EP3628907A1 set forth connectors according to prior art comprising beveled portions facilitating connection.

SUMMARY

The invention relates to an aircraft fluid conduit, the conduit comprising a piping of thermoplastic material comprising a connection end extending along a piping axis and a connector for being mounted in the connection end by a translational movement along the piping axis from upstream to downstream.

the connection end defining a piping internal surface, configured to be in contact with a fluid, and a piping external surface, opposite to the piping internal surface, the connector extending along a connector axis and comprising a connecting portion, extending longitudinally along the connector axis, configured to extend into the connection end, the connecting portion defining a connector internal surface, to be in contact with the fluid, and a connector external surface, opposite to the connector internal surface and configured to be in contact with the piping internal surface of the connection end.

The connector is remarkable in that the connection portion has a free longitudinal end that is beveled, the free longitudinal end being configured to be radially deformed as a result of assembling the connector in the connection end, previously thermally expanded, so that the conduit has an internal surface having a substantially constant internal radius at the interface between the connector and the piping.

The piping according to the invention makes it possible to limit the risk of a discontinuity between the connector internal surface and the piping internal surface when the connector is mounted in the connection end of the piping. The linkage between the connector and the piping thus limits the risk of forming a water retention zone, or even waste retention, which could reduce the quality of health maintenance of the piping. Advantageously, before assembly, the connecting portion of the connector has an imperfect shape that is deformed during assembly so that the conduit has an internal surface having a substantially constant internal radius at the interface between the connector and the piping. A beveled free longitudinal end makes it possible to take advantage of the elasticity of the connecting portion in order to allow rotation of the bevel during cooling.

Preferably, the connecting portion of the connector has a thickness of between 1.15 and 1.50 mm.

Preferably, in a longitudinal half cross-section plane with respect to the connector axis, the free longitudinal end comprises a tilted wall, with respect to the connector axis, formed on the connector internal surface. The tilted wall is radially outwardly tilted in the upstream to downstream direction. Preferably, after mounting the connector in the connection end, the tilted wall is configured to extend parallel to the piping axis.

Preferably, the piping is tubular with a constant internal radius.

Preferably, the tilted wall forms with the connector axis a tilt angle between 5 and 10°. Such a tilt angle corresponds to the tilt angle induced when cooling the piping.

Preferably, the connector internal surface comprises a longitudinal wall, with a constant internal radius, and a tilted wall. Further preferably, the connector internal surface comprises only a longitudinal wall and a tilted wall. The connector structure is simple, making it easy to manufacture and reduce its mass.

According to one preferred aspect, the longitudinal length of the projection of the tilted wall onto the connector axis is between 3 and 6 mm.

Preferably, the longitudinal length of the longitudinal wall is between 15 and 20 mm.

Preferably, in a longitudinal half cross-section plane with respect to the axis of the connector, the free longitudinal end comprises at least one curvilinear wall formed on the connector external surface. Preferably, the curvilinear wall extends facing the tilted wall so as to guide radial contraction forces. Preferably, the curvilinear wall has a radius of curvature of between 1.5 and 3 mm. Such a curvilinear wall advantageously fulfills a dual function by, on the one hand, preventing injury to the piping during insertion and cooling. On the other hand, such a curvilinear wall makes it possible to guide radial contraction forces to deform the free longitudinal end in a controlled manner.

Preferably, the connector external surface comprises at least one hooking member extending radially protrudingly. Preferably, the hooking member successively has, in the longitudinal half cross-section plane, a tilted portion, to allow mounting by inserting the connector into the connection end of the piping by translation downstream along the piping axis, and a radial stop portion to prevent shrinkage by translation upstream along the piping axis. Further preferably, the connector external surface comprises at least two hooking members.

The invention also relates to a piping whose connector is assembled in the connection end of the piping by a translational movement along the piping axis from upstream to downstream, the free longitudinal end being radially deformed following assembling of the connector in the connection end, previously thermally expanded, the piping having an internal surface having a substantially constant internal radius at the interface between the connector and the piping. In the assembled position, the internal surface has a substantially constant internal radius, without protrusion or trough, which avoids any retention of fluid which may lead to a limitation in the quality of health maintenance of the piping.

The invention is also directed to a fluid circuit, in particular for an aircraft, comprising at least two conduits as set forth previously, the connectors of the conduits being connected by a connecting linkage.

The invention also relates to a method for assembling a conduit as set forth previously, the method comprising:
- a step of hot preforming the connection end of the piping so as to expand it radially.
- a step of inserting the connecting portion of the connector into the connection end of the piping,
- a step of radially deforming, when cooling the connection end of the piping, the free longitudinal end so that the conduit has an internal surface having a substantially constant internal radius at the interface between the connector and the piping.

BRIEF DESCRIPTION OF THE DRAWINGS

The invention will be better understood upon reading the following description, given as an example, and referring to the following figures, given as non-limiting examples, in which identical references are given to similar objects.

It should be noted that the figures set out the invention in detail to implement the invention, wherein said figures can of course be used to better define the invention if necessary.

DETAILED DESCRIPTION

The invention relates to an aircraft fluid conduit CA, the conduit CA comprising a piping 1 of thermoplastic material comprising a connection end 11 extending along a piping axis X and a connector 2 to be mounted in the connection end 11 by a translational movement along the piping axis X from upstream to downstream. Such conduits CA can be connected to form a fluid circuit, for example a waste water circuit mounted in an aircraft. Each conduit CA preferably has a circular cross-section.

Figure 4:
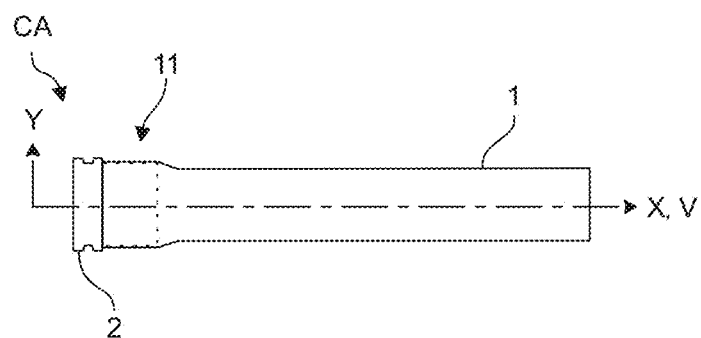
FIG. 4 is a schematic representation of a conduit comprising a piping and a connector according to one embodiment of the invention that are assembled.

As represented in [FIG. 4], the piping 1 comprises a connection end 11 extending longitudinally along the piping axis X, oriented from upstream to downstream, and radially along an axis Y, oriented from inside to outside, so as to form an orthogonal reference frame (X, Y). The piping 1 may be rectilinear or bent and comprise a plurality of connection ends 11. Referring to [FIG. 5], the connection end 11 (as well as the piping 1) defines a piping internal surface SI1, configured to be in contact with the fluid, and a piping external surface SE1, opposite to the piping internal surface SI1.

The piping 1 is made of thermoplastic material. Preferably, the piping 1 is made of a PEEK (meaning polyetheretherketone) polymeric material, allowing the use of a semi-rigid, light and robust piping 1 (hence easier to handle and install).

In this example, the piping 1 has a thickness of less than 2 mm, so as to reduce its mass. Preferably, the thickness of the piping 1 is between 0.5 and 2 mm. The connection end 11 has an internal radius RI which depends on the dimension of the piping 1 and which is preferably between 10 and 60 mm. The internal radius R1 corresponds to the radius of the piping 1 in the rest state, that is when the piping 1 is cold and is not subjected to any force.

Figure 5:
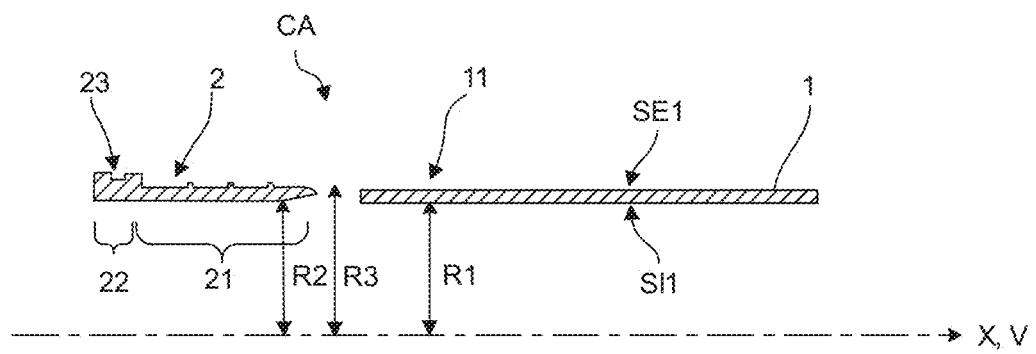
FIG. 5 is a longitudinal half cross-section view of the piping and connector of [FIG. 4] in the unassembled position.
Figure 6:
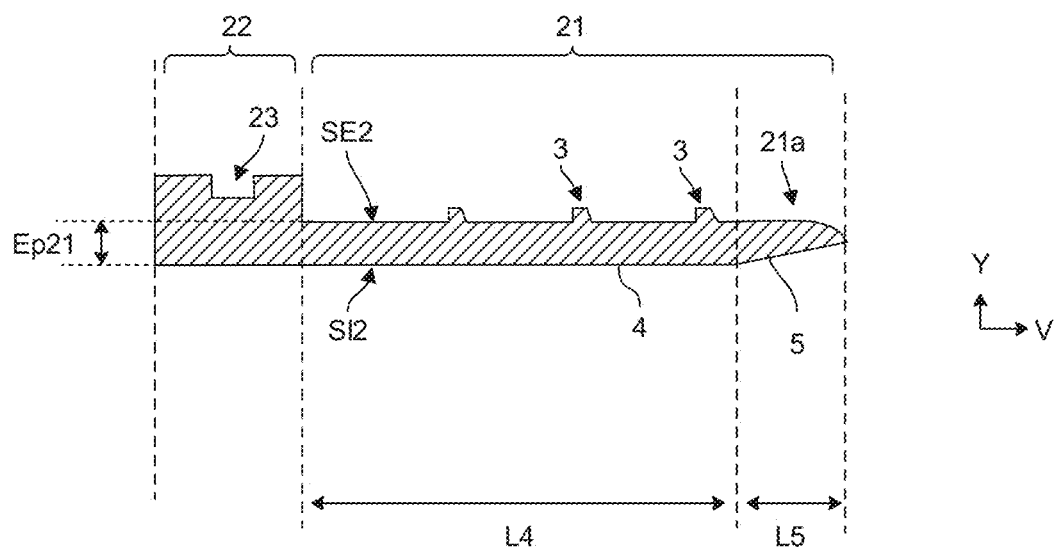
FIG. 6 is a close-up view of the connector of [FIG. 5].

With reference to FIGS. 5 and 6, the connector 2 is to be mounted to the connection end 11 of the piping 1 as illustrated in [FIG. 4]. In particular, the connector 2 is configured to be inserted into the connection end 11 by translation downstream along the piping axis X as described in more detail below.

The connector 2 extends along a connector axis V. As represented in [FIG. 4], when the connector 2 is mounted into the connection end 11 of the piping 1, the connector axis V and the piping axis X are coaxial.

Preferably, connector 2 is made of a thermoplastic material. Further preferably, the connector 2 is made of a PEEK polymeric material allowing the use of a semi-rigid, thus easy to handle, light and robust connector 2. The assembly of a piping 1 and a connector 2 formed from thermoplastic materials ensures optimum connection. The connector 2 is obtained by machining or molding, in particular, by injection.

With reference to FIGS. 5 and 6, the connector 2 comprises a connecting portion 21 to the piping 1, to be inserted into the connection end 11 of the piping 1, and a linking portion 22, to be positioned externally to the piping I. The connecting portion 21 forms a downstream part while the linking portion 22 forms an upstream part of the connector 2. Preferably, the connector 2 comprises only a connecting portion 21 and a linking portion 22.

Preferably, the linking portion 22 is to be positioned facing the linking portion 22 of another connector 2 of an adjacent piping 1, with a view to connecting them to form a fluid circuit.

As represented in [FIG. 6], the linking portion 22 comprises a cooperation member 23, in particular, an annular groove for placing a connecting linkage connecting two adjacent conduits CA. It goes without saying that the cooperation member 23 could be in a different form, a protruding portion, a finger, etc.

Figure 7:
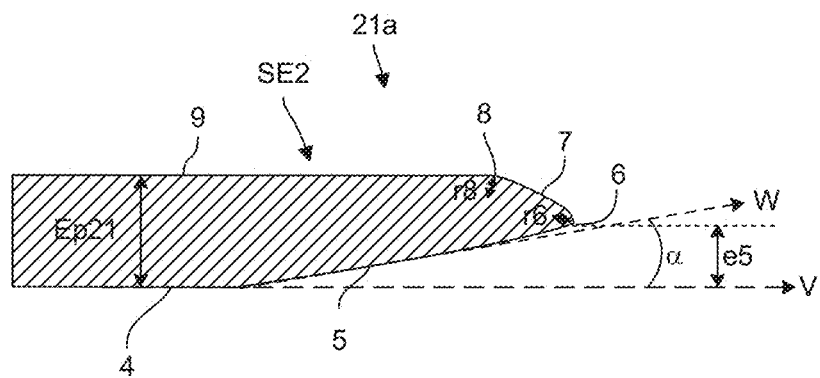
FIG. 7 is a close-up view of a free longitudinal end of the connector of [FIG. 6].

Still with reference to [FIG. 6], the connecting portion 21 comprises a free longitudinal end 21a of which a close-up view is represented in [FIG. 7].

The connecting portion 21 of the connector 2 has an external radius R3 ([FIG. 5]) strictly greater than the internal radius RI of the piping 1, so as to provide a tight connection, as described below. In this example, the connecting portion 21 has a thickness Ep21 of between 1.15 and 1.50 mm. The connecting portion 21 defines a connector internal surface SI2 and a connector external surface SE2, opposite to the connector internal surface SI2.

The connector internal surface SI2 is to be in contact with the fluid, when the conduit CA is assembled.

With reference to [FIG. 6], the connector internal surface SI2 comprises, in a longitudinal half cross-section plane, successively along the connector axis V, a rectilinear longitudinal wall 4, parallel to the connector axis V, with a constant internal radius R2 (represented in [FIG. 5]), and a tilted wall 5 with respect to the connector axis V so as to form a beveled free longitudinal end 21a, that is, the cross-section of which is decreasing from upstream to downstream as illustrated in [FIG. 6]. The internal radius R2 of the rectilinear longitudinal wall 4 is substantially identical to the internal radius R1 of the connection end 11.

The longitudinal wall 4 extends parallel to the connector axis V and has a length L4 of between 9 and 25 mm. The connecting portion 21 is thus long enough to hold the connector 2 in position in the connection end 11 of the piping 1.

With reference to [FIG. 7], the tilted wall 5 is formed at the free longitudinal end 21a of the connecting portion 21 and extends along an oblique axis W forming with the connector axis V a tilt angle a strictly greater than 0°, preferably between 5° and 10°. The free longitudinal end 21a of the connecting portion 21 is thus convergent. In other words, the free longitudinal end 21a of the connector 2 has the shape of a spout, configured to provide continuity with the piping internal surface SI1 when the connector 2 is mounted in the connection end 11, as will be described in more detail later. Due to the bevel, the free longitudinal end 21a of the connecting portion 21 can deform during assembly in a controlled manner in order to align parallel to the connector axis V, thereby avoiding any disadvantageous internal protrusion.

Preferably, the projection of the tilted wall 5 onto the connector axis V determines a length L5 (represented in [FIG. 6]) of between 3 and 6 mm. Still with reference to [FIG. 7], the tilted wall 5 determines a deformation space c5 between its downstream end and the connector axis V of between 0.4 and 0.8 mm which allows the free longitudinal end 21a to tilt in order to align parallel with the connector axis V as will be set forth below.

The external connecting surface SE2 of connector 2 is configured to be in contact with the piping internal surface SI1 of the connection end 11.

With reference to [FIG. 6], the external connecting surface SE2 of the connector 2 comprises a plurality of hooking members 3 extending radially protruding from the external connecting surface SE2. The hooking members 3 allow once the connector 2 is assembled to the piping 1 to hold it in position and avoid disassembly. Preferably, the external connecting surface SE2 comprises three hooking members 3, so as to enhance connection between the connector 2 and the piping 1. As illustrated in [FIG. 6], the hooking members 3 are offset longitudinally along the length of the connector 2, that is along the axis of the connector V. Further preferably, the hooking members 3 are also evenly distributed along the length of the connecting portion 21.

Figure 8:
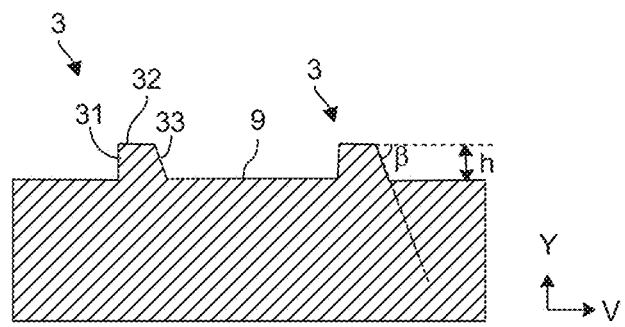
FIG. 8 is a schematic representation of two hooking members of the connector of [FIG. 6].

With reference to [FIG. 8], each hooking member 3 has a height h, that is a radial distance along the axis Y in the longitudinal half cross-section plane, between 0.4 and 0.75 mm. In this example, each hooking member 3 has successively, from upstream to downstream, in the longitudinal half cross-section plane, a radial stop portion 31, a longitudinal portion 32 and a tilted portion 33. The tilted portion 33 allows mounting by inserting from upstream to downstream the connector 2 in the connection end 11 of the piping 1 by promoting sliding of the piping 1 against the hooking member 3. In this example, the tilted portion 33 forms with the connector axis V an angle 13 of between 30 and 60°, so as to facilitate insertion of the connector 2 into the piping 1. Conversely, the radial stop portion 31 prevents the connector 2 from being removed by translation from upstream to downstream.

Preferably, the tilted portion 33 and the longitudinal portion 32, as well as the longitudinal portion 32 and the radial stop portion 31, are connected through a rounded chamfer (not represented) making it possible to limit wear or damage to the piping 1 when inserting the connector 2 into the connection end 11. Such rounding makes it easier to slide one piece in relation to the other.

In one preferred embodiment, with reference to [FIG. 7], the external connecting surface SE2 successively comprises from downstream to upstream, in the longitudinal half cross-section plane, from the free longitudinal end 21a: an insertion tip 6, a curvilinear tilted wall 7, a curvilinear wall 8 and a curvilinear longitudinal wall 9 which is parallel to the connector axis V. The hooking members 3 are formed on the curvilinear longitudinal wall 9.

The insertion tip 6 preferably has a rounded profile so as to limit the risk of damaging the piping 1 when inserting the connector 2. Preferably, the rounded insertion tip 6 has a radius of curvature r6 of between 0.2 and 0.4 mm. The curvilinear wall 8 forms, on the external connecting surface SE2, a toric portion, which facilitates insertion of the connector 2 into the connection end 11 of the piping 1, without damaging the piping 1. The curvilinear wall 8 preferably has a radius of curvature r8 of between 1.5 and 3 mm.

Figure 9:
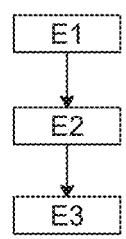
FIG. 9 is a schematic representation of the steps of a method for assembling a connector and a piping according to one implementation of the invention.

A method for assembling a piping 1 and a connector 2, according to one embodiment of the invention, will henceforth be described, with reference to [FIG. 9].

Figure 10:
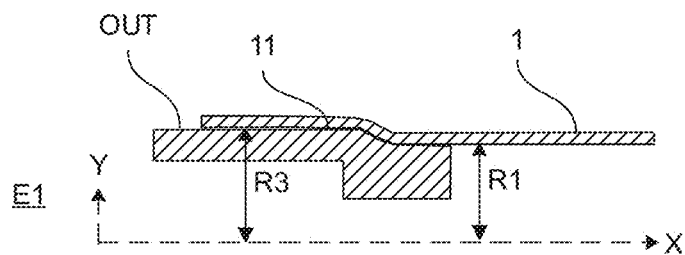
FIG. 10 is a schematic representation of a step of hot preforming the connection end of the piping.
Figure 11:
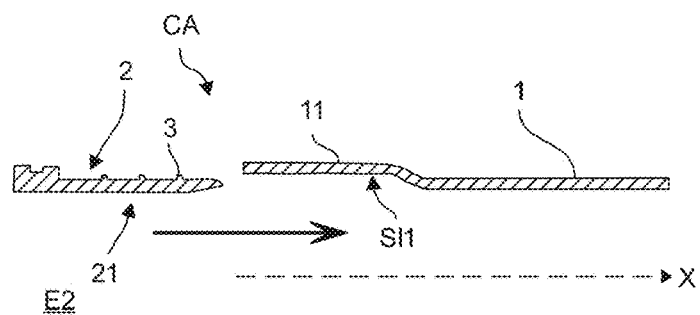
FIG. 11 is a schematic representation of a step of inserting the connecting portion of the connector into the connection end of the piping.

The assembly method first comprises a step E1 of hot preforming the connection end 11 of the piping 1. For this, with reference to [FIG. 10]. an operator heats the connection end 11 which is softened under the effect of heat and inserts a tooling OUT for radially expanding the walls of the piping 1 and thus increasing its internal radius RI, until a similar internal radius to the external radius R3 of the connecting portion 21 of the connector 2 is reached.

Figure 1:
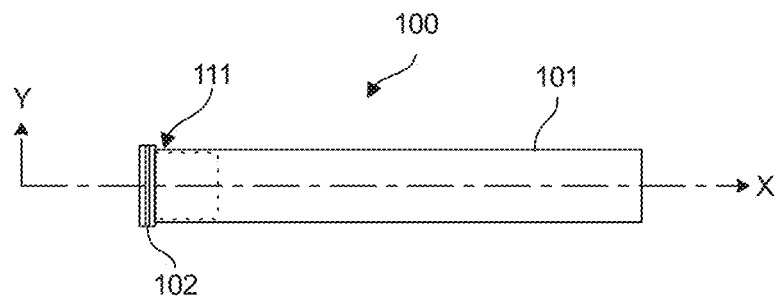
FIG. 1 is a schematic representation of a conduit comprising a piping and a connector of prior art that are assembled.
Figure 2:
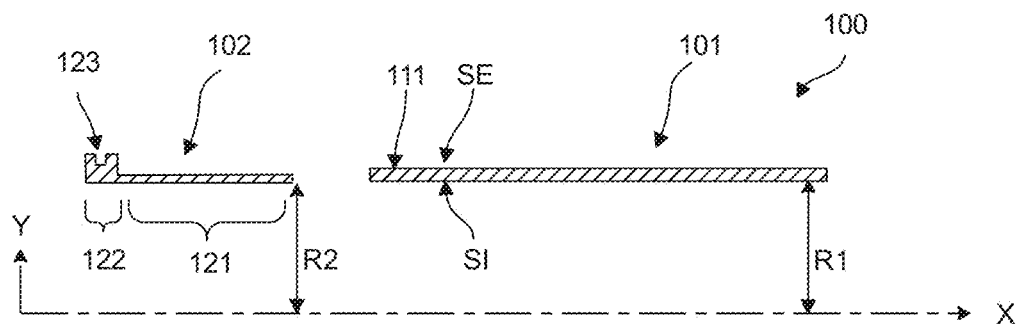
FIG. 2 is a longitudinal half cross-section view of the piping and connector of [FIG. 1] in an unassembled position.
Figure 3:
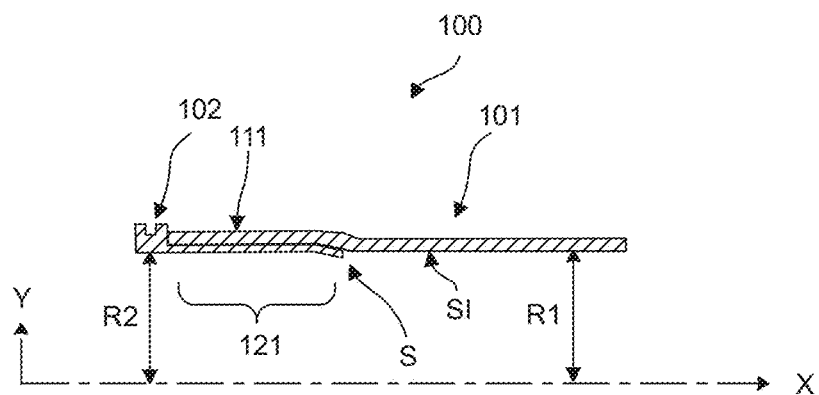
FIG. 3 is a schematic cross-section representation of the conduit of [FIG. 1].

As the piping 1 is still hot, the operator then inserts, in a second insertion step E2, the connecting portion 21 of the connector 2 into the connection end 11 of the piping 1 as illustrated in [FIG. 1]. By virtue of the profile of the hooking members 3, the piping internal surface SI1 slides along the tilted portions 33, facilitating insertion of the connector 2 into the piping 1.

Figure 12:
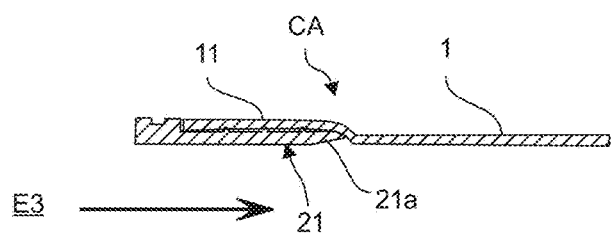
FIG. 12 is a schematic representation of the conduit at the beginning of the cooling step.

With reference to [FIG. 12], when the connecting portion 21 is inserted into the connection end 11, the method comprises a step of cooling E3 the connection end 11 of the piping 1, which contracts and thus radially tightens so as to intimately press the piping internal surface SI1 against the connector external surface SE2. The connection is thus made by shrinking due to cooling at room temperature, in this example between 15 and 20° C.

Figure 13:
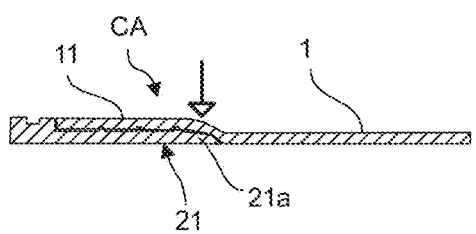
FIG. 13 is a schematic representation of the conduit at the end of the cooling step.
Figure 14:
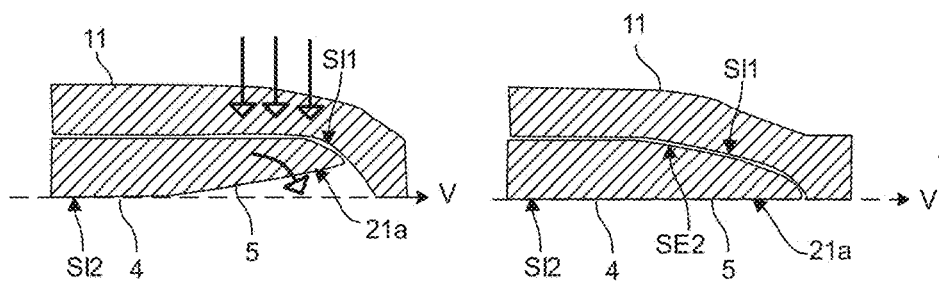
FIG. 14 is a close-up schematic representation of the interface between the connector and the piping at the beginning and end of the cooling step.

When cooling the connection end 11 of the first piping 1, the bevel-shaped free longitudinal end 21a is gradually deformed radially inwardly of the connector 2 as represented in FIGS. 13 and 14. The tilted wall 5 of the connector internal surface SI2 is then gradually aligned, during the cooling step E3, with the longitudinal wall 4 parallel to the axis of the connector V so that the conduit CA has an internal surface having a substantially constant internal radius at the interface between the connector 2 and the piping 1 ([FIG. 14]). In other words, during assembly, the free longitudinal end 21a is restricted and achieves optimum alignment. Cleverly, before assembly, the free longitudinal end 21a has an imperfect shape that is corrected by the cooling step E3 of the assembly method. Advantage is taken from elasticity of the free longitudinal end 21a to ensure controlled deformation.

As illustrated in [FIG. 14], the connector external surface SE2 of the free longitudinal end 21a makes it possible to snugly fit the shape of the piping internal surface SI1 in such a way as to form a robust, tight connection free of stresses which may reduce the service life of the assembly. There is no point of weakness, in particular, when the connector 2 and the piping 1 are of thermoplastic materials. In addition, such a robust connection facilitates health maintenance of the conduits CA.

When the piping 1 is cooled, the free longitudinal end 21a of the connector 2 does not form any internal protrusion or discontinuity that may lead to the trapping of fluids. The risk of defect is dramatically reduced. By virtue of the assembly method according to the invention, the conduit CA obtained is tight and robust, even with a thin-walled PEEK polymer piping.

Figure 15:
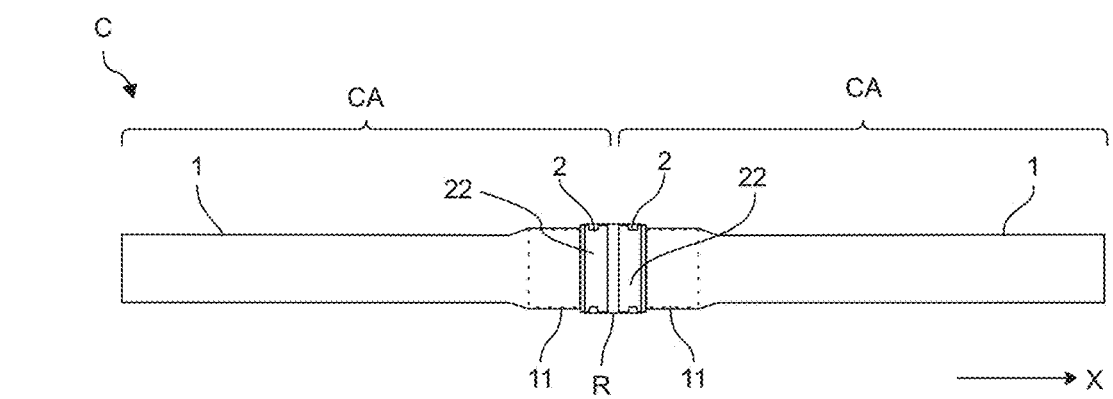
FIG. 15 is a schematic representation of a fluid circuit comprising two conduits connected by through a linkage.

Assembly of a connector 2 at a connection end 11 of a piping 1 has been set forth. The assembly method can advantageously be repeated for each connection end 11 of a piping 1 in order to obtain fluid conduits CA that can be attached to the structure of an aircraft. Referring to [FIG. 15], the conduits CA are then connected together through a connecting linkage R in order to form a fluid circuit C. Advantageously, the connecting linkage R cooperates with the linking portions 22 of the connectors 2 to ensure optimal connection.

The invention claimed is:

1. An aircraft fluid conduit, the conduit comprising a piping of thermoplastic material comprising a connection end extending along a piping axis and a connector to be mounted in the connection end by a translational movement along the piping axis from upstream to downstream,
   the connection end comprising a piping internal surface configured to be in contact with a fluid and a piping external surface, opposite to the piping internal surface,
   the connector extending along a connector axis and comprising a connecting portion, extending longitudinally along the connector axis configured to extend into the connection end of the piping, the connecting portion comprising a connector internal surface, to be in contact with the fluid, and a connector external surface, opposite to the connector internal surface and configured to be in contact with the piping internal surface of the connection end, the connecting portion of the connector having a free longitudinal end,
   the free longitudinal end of the connector has (a) a first configuration prior to assembling with the piping, in which the free longitudinal end has a beveled portion on the connector internal surface having an internal radius that is larger than an internal radius of the connecting portion away from the beveled portion, and (b) a second configuration after mounting into the connector end of the piping, in which the internal radius at the beveled portion is substantially constant with an internal radius of the piping.

2. The aircraft fluid conduit according to claim 1, wherein, in a longitudinal half cross-section plane with respect to the connector axis in the first configuration, the beveled portion is a tilted wall, with respect to the connector axis.

3. The aircraft fluid conduit according to claim 2, wherein the tilted wall has a tilt angle of between 5° and 10° with respect to the connector axis.

4. The aircraft fluid conduit according to claim 2, wherein the connector internal surface comprises a longitudinal wall and the tilted wall, and wherein the longitudinal wall has a constant internal radius.

5. The aircraft fluid conduit according to claim 4, wherein a longitudinal length of the longitudinal wall is between about 9 mm and 25 mm.

6. The aircraft fluid conduit according to claim 2, wherein a longitudinal length of the tilted wall along the connector axis is between about 3 mm and 6 mm.

7. The aircraft fluid conduit according to claim 1, wherein, in a longitudinal half cross-section plane with respect to the connector axis, the free longitudinal end of the connector comprises at least one curvilinear wall formed on the connector external surface.

8. The aircraft fluid conduit according to claim 1, wherein the connector external surface comprises at least one hooking member radially protrudingly extending.

9. The aircraft fluid conduit according to claim 1, wherein the connector is assembled in the connection end of the piping by a translational movement along the piping axis from upstream to downstream, the free longitudinal end being radially deformed following assembling of the connector into the connection end, previously thermally expanded, the conduit having an internal surface having a substantially constant internal radius at the interface between the connector and the piping.

10. A fluid circuit comprising at least two conduits according to claim 1, the connectors of the at least two conduits being connected by a connecting linkage.

11. A method for assembling the aircraft fluid conduit according to claim 1, the method comprising:
a step of hot preforming the connection end of the piping so as to expand the piping radially,
a step of inserting the connecting portion of the connector into the connection end of the piping,
a step of radially deforming, when cooling the connection end of the piping, the free longitudinal end so that the conduit has an internal surface having a substantially constant internal radius at the interface between the connector and the piping.

12. An aircraft fluid conduit comprising:
a piping of thermoplastic material comprising a connection end and an opposite end, the connection end having a piping external surface and a piping internal surface defining an internal diameter and a piping axis, the piping internal surface configured to be in contact with a fluid;
a connector to be mounted in the piping, connection end of the piping by a translational movement along the piping axis, the connector having a body extending along a connector axis and comprising a connecting portion configured to extend into the connection end of the piping, the connecting portion comprising a connector external surface configured to be in contact with the piping internal surface and a connector internal surface defining an internal diameter configured to be in contact with the fluid, the connecting portion of the connector comprising a free longitudinal end;
wherein the free longitudinal end of the connector comprises at least two spaced apart projections on the connector external surface with each projection comprising a radial stop surface and a titled portion arranged so that that tilted portion enters the connection end of the pipping before the radial stop surface; and
wherein the free longitudinal end of the connector comprises (a) a first configuration prior to assembling with the piping, in which the free longitudinal end has a beveled portion on the connector internal surface having a first internal diameter that is larger than a second internal diameter of the connecting portion away from the beveled portion, and (b) a second configuration after mounting into the connector end of the piping, in which the first internal diameter at the beveled portion is substantially constant with the internal diameter of the piping.

13. The aircraft fluid conduit according to claim 12, wherein the beveled portion is a tilted wall with respect to the connector axis.

14. The aircraft fluid conduit according to claim 13, wherein the tilted wall has a tilt angle of between 5° and 10° with respect to the connector axis.

15. The aircraft fluid conduit according to claim 13, wherein the connector internal surface comprises a longitudinal wall and the tilted wall, and wherein the longitudinal wall has a constant internal diameter.

16. The aircraft fluid conduit according to claim 15, wherein a longitudinal length of the tilted wall along the connector axis is between about 3 mm and 6 mm.

17. The aircraft fluid conduit according to claim 16, wherein a longitudinal length of the longitudinal wall is between about 9 mm and 25 mm.

18. A method for assembling a conduit comprising a piping and a connector comprising:
heating the piping, the piping made of a thermoplastic material comprising a connection end and an opposite end, the connection end having a piping external surface and a piping internal surface defining an internal diameter and a piping axis, the piping internal surface configured to be in contact with a fluid;
heating the connector, the connector having a body extending along a connector axis and comprising a connecting portion having a connector external surface configured to be in contact with the piping internal surface and a connector internal surface defining an internal diameter configured to be in contact with the fluid, the connecting portion of the connector comprising a free longitudinal end, wherein the free longitudinal end has a beveled portion on the connector internal surface having a first internal diameter that is larger than a second internal diameter of the connecting portion away from the beveled portion;
inserting the free longitudinal end of the connector into the connection end of the piping;
allowing the piping and the connector to cool to radially deform the connection end of the piping and the beveled portion of the connector and for the first internal diameter at the beveled portion to be substantially constant with the internal diameter of the piping.

19. The method of claim 18, wherein the free longitudinal end of the connector is inserted with an orientation in which a tilted portion of a projection is inserted into the connection end of the piping before a radial stop surface on the projection.

* * * * *